United States Patent
Hager et al.

(10) Patent No.: US 7,644,980 B2
(45) Date of Patent: Jan. 12, 2010

(54) VEHICLE ROOF WITH A MOVABLE ROOF SECTION

(75) Inventors: Christian Hager, Bruckmühl (DE); Robert Bertsch, Munich (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 11/994,901

(22) PCT Filed: Jul. 7, 2006

(86) PCT No.: PCT/DE2006/001176
§ 371 (c)(1),
(2), (4) Date: Jun. 20, 2008

(87) PCT Pub. No.: WO2007/006276
PCT Pub. Date: Jan. 18, 2007

(65) Prior Publication Data
US 2009/0134671 A1 May 28, 2009

(30) Foreign Application Priority Data
Jul. 9, 2005 (DE) .................. 10 2005 032 437

(51) Int. Cl.
*B60J 7/057* (2006.01)
(52) U.S. Cl. .................. 296/223; 296/221; 296/222
(58) Field of Classification Search ..................
296/216.02–216.05, 221–223
See application file for complete search history.

(56) References Cited

U.S. PATENT DOCUMENTS

| 6,257,658 B1 * | 7/2001 | Nabuurs et al. | 296/223 |
| 6,325,453 B1 * | 12/2001 | Manders | 296/223 |
| 6,394,540 B1 * | 5/2002 | Manders | 296/223 |
| 6,494,529 B1 * | 12/2002 | Manders | 296/222 |
| 6,537,006 B1 * | 3/2003 | Clark | 411/82 |
| 6,695,398 B2 * | 2/2004 | Racine et al. | 296/216.03 |

FOREIGN PATENT DOCUMENTS

| DE | 3607724 | 8/1987 |
| DE | 9116421 | 11/1992 |
| DE | 19514585 | 5/1998 |
| DE | 29924601 | 4/2004 |
| GB | 2144174 | 2/1985 |

* cited by examiner

*Primary Examiner*—Dennis H Pedder
(74) *Attorney, Agent, or Firm*—Fitch, Even, Tabin & Flannery; John M. Naber

(57) ABSTRACT

The invention relates to a vehicle roof with a movable roof section which can be deployed into a ventilation position by means of a deploy and/or displacement mechanism and/or then displaced above or below the vehicle roof or an at least temporarily stationary roof section for at least partially releasing a roof opening in the vehicle roof. The deploy and/or displacement mechanism comprises at least one vertical gate (9) which has at least one guide web (10), disposed perpendicular to the gate (9) and having slide tracks (15, 16) that are at least partially encircled by a slide element of a slide (8) that can be displaced along a guide rail. The gate (9) is produced from metal and the guide web (10) at least partially from plastic. In order to provide a simple and stable gate (9) having good sliding properties, the gate (9) comprises a plurality of spaced-apart openings (11) for anchoring the plastic (14) of the guide webs (10).

9 Claims, 3 Drawing Sheets

VEHICLE ROOF WITH A MOVABLE ROOF SECTION

This application is a 35 U.S.C. §371 National Stage entry of PCT/DE2006/001176, filed Jul. 7, 2006, which claims priority from German Patent Application No.: DE 10 2005 032 437.1, filed Jul. 9, 2005, the contents of which are herein incorporated by reference.

The invention relates to a vehicle roof with a movable roof section that can be deployed into a ventilation position by means of a deployment and/or displacement mechanism and/or can be displaced above or below the vehicle roof or an at least temporarily stationary roof section to at least partially release a roof opening in the vehicle roof according to the preamble of patent Claim 1.

DE 195 14 585 C2 describes such a vehicle roof in which the gate is made completely of plastic and, in order to achieve a suitable mechanical strength and stability, has thick walls accordingly.

DE 91 16 421 U1 discloses another vehicle roof with which the gate is made of sheet metal. According to this variant, a guide slot formed in the gate is sheathed with a plastic around its edges. Despite this somewhat broader plastic sheathing, both the load-bearing capacity and the width of the guide path for the pin sliding in the guide slot are limited.

DE 299 24 601 U1 discloses another vehicle roof with which the gate is formed by two adjacent sheet metal parts, which are each bent downward at their lower edges. The webs angled outward are completely sheathed in plastic. With this variant, the complexity involved in bending the sheet metal gates and the resulting relative large manufacturing tolerances are a disadvantage.

The object of the present invention is to provide a vehicle roof with a gate that is easy to manufacture, has low dimensional tolerances and a high strength with small dimensions.

This object is achieved according to the present invention by the features of patent Claim 1. Advantageous embodiments of the present invention are characterized in the dependent claims.

The core of the present invention is that the gate made of metal in the lower vertical area has a plurality of passages arranged a distance apart from one another, serving to anchor the plastic of the guide webs.

According to a first variant, the passages have plastic material passing directly through them and also forming the guide web. Due to the fact that the passages are surrounded by plastic, the plastic material is securely bonded to the vertical web of the gate.

According to a second variant, the gate has a protruding embossing surrounded by the plastic material of the guide webs protruding outward in the direction of the guide webs in the area of the passages. Due to this embossing, the surface of the guide area between the metallic gate and the plastic material is increased in comparison with the simple passages of the first variant, thereby further increasing the load-bearing capacity of the gate.

According a third variant, the passages serve to anchor load-bearing bolts, which in turn support the plastic material of the guide webs. The load-bearing bolts may be made of metal, but they are preferably also made of a plastic having a greater strength than the plastic material forming the slide tracks of the guide webs. To this end, the plastic of the load-bearing bolts may be reinforced with fibers such as glass fibers or carbon fibers.

The load-bearing bolts may penetrate through the passages and thus serve as a bracket/carrier for the plastic material of the guide webs on both sides of the gate.

Two metal sections that are a mirror image of one another are preferably joined together with their smooth back walls to form a joint gate, so that one guide web extends on each side. The guide webs in this case are preferably created by injection molding of plastic material on the lower edges of the gate and in the area of the passages arranged above.

According to an advantageous embodiment, a flange that serves to attach the gate to the movable roof section is provided in the upper area of the gate. According to a first alternative, the flange is formed by outwardly angled legs of the metal sections. As an alternative to this, the flange may also be formed by an intermediate space between the two metal sections with which a beam of the movable roof section engages.

As an alternative to mounting on the cover, an inventive gate may also be arranged on a displaceable carriage and then may be engaged with a sliding element or swivel lever mounted on the movable roof part.

The present invention is suitable for a lifting roof, a sliding/lifting roof, a spoiler roof and an externally guided sliding roof (ESD).

The vehicle roof is explained in greater detail below on the basis of three exemplary embodiments with reference to the drawing, in which FIG. 1 shows a schematic top view of a vehicle roof with a movable roof part in a partially opened position;

Figure 1:
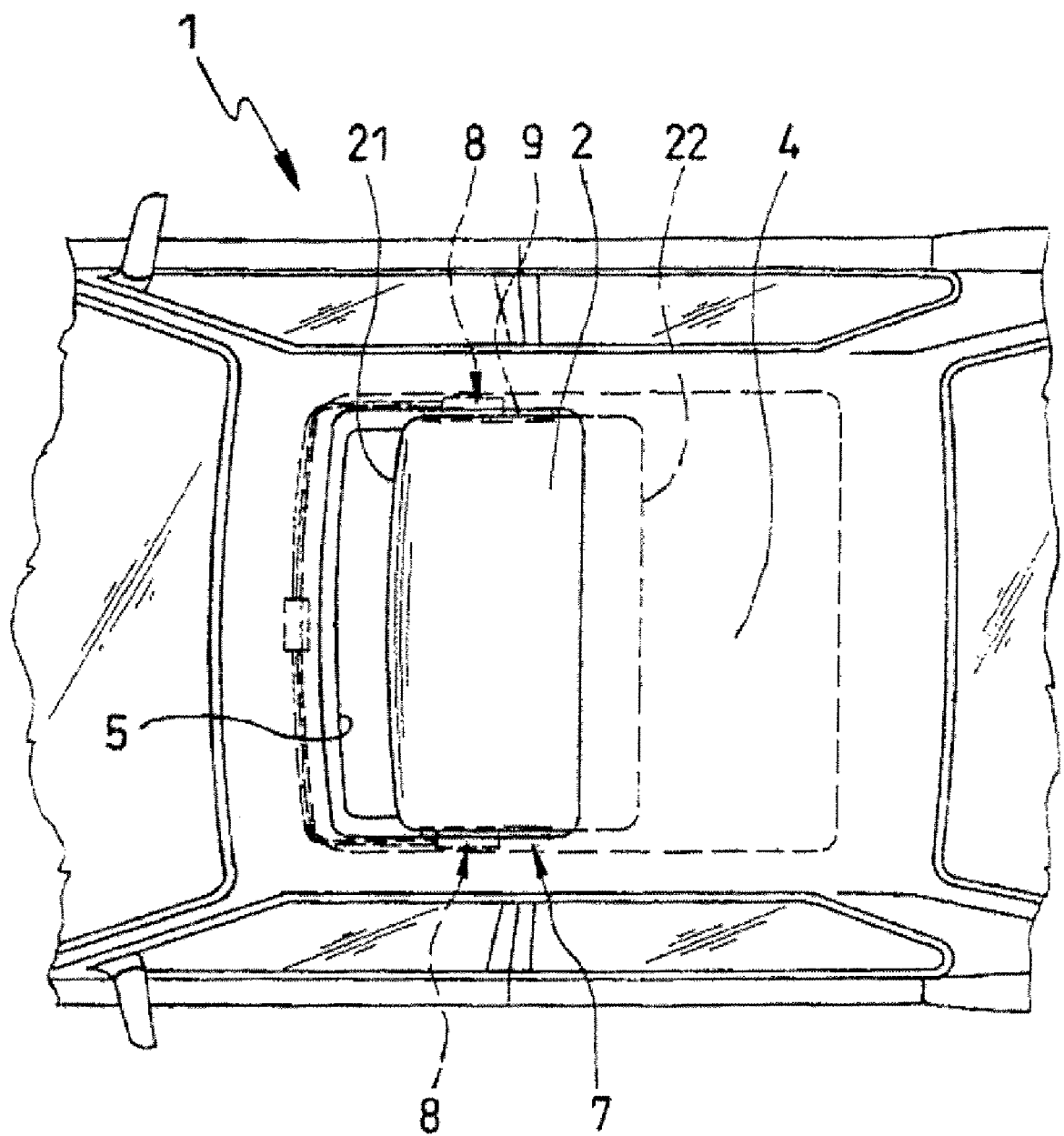

The vehicle roof 1 shown in FIG. 1 has a movable roof part 2, which is pivotable about a pivot axis situated near its front edge 21, pivoting on guide rails 7 arranged at the sides of a roof opening 5, thereby being deployable with its rear edge 22 into a ventilation position. In the example shown here, the roof part 2 is designed as a sliding/lifting roof and in addition, with its rear edge 21 it can be lowered beneath a fixed roof part 4 and displaced toward the rear to release the roof opening 5.

Figure 2:
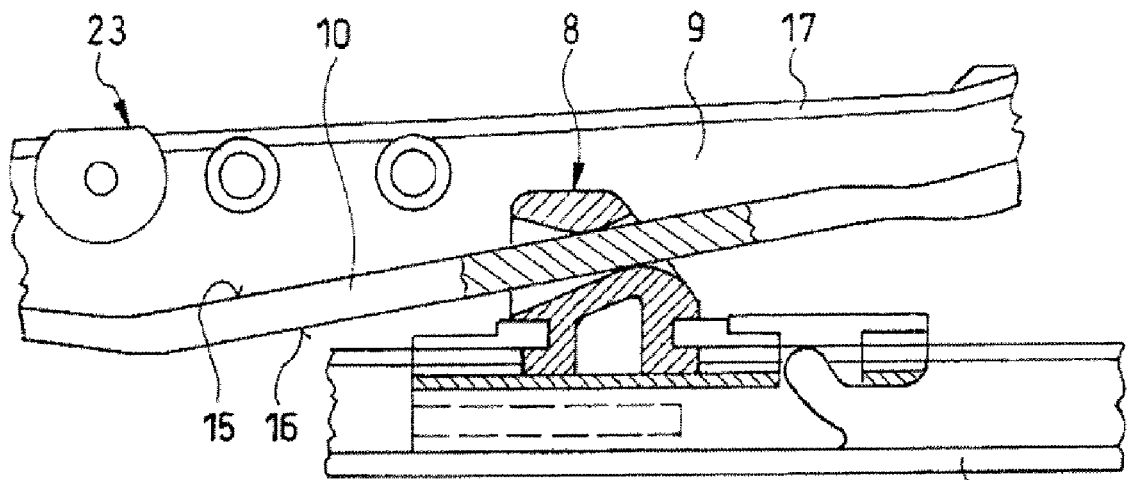
FIG. 2 shows a schematic side view of a gate arranged on the roof part and a displaceable carriage.
Figure 3:
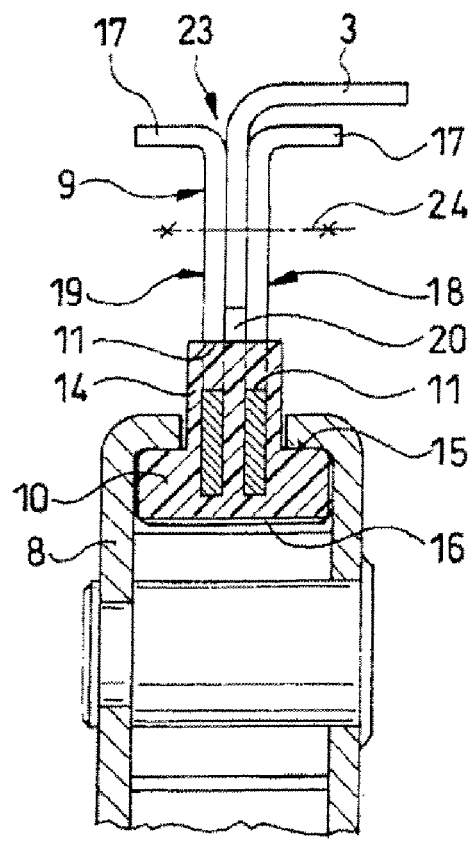
FIG. 3 shows a cross section through a first inventive embodiment of a cover gate.

The movable roof part 2 is provided with an essentially vertical gate 9 in the area of each of its side edges. This gate 9 preferably has two symmetrically opposed guide webs 10 near its lower edge, forming a slide track 15 on the top side and a slide track 16 on the bottom side. The slide tracks 15 and/or 16 serve to guide a carriage 8 that is longitudinally displaceably guided in the guide rail 7. The carriage 8 can be driven by means of an electric drive (not shown) via a drive cable (not shown). To this end, the carriage 8 reaches around the two slide tracks 15 pointing upward and the lower slide tracks 16 on the two opposite guide webs 10, as shown in FIG. 3. Since the guide webs 10 shown in FIG. 2 form a curved path over the length of the gate 9 as a whole, the roof part 2 is raised with its rear edge 22 forward in displacement of the carriage 8 out of the position in FIG. 2 and is lowered with its rear edge 22 toward the rear in displacement of the carriage 8 out of the position shown in FIG. 2.

As shown in a first embodiment according to FIG. 3, the gate 9 is preferably formed by two identical metal sections 18 and 19 in mirror image to one another, each having at its upper edge a horizontal cross web 17 angled inward or outward, respectively. The cross webs 17 may serve directly as a flange 23 for fastening the movable roof art 2. In the example shown here according to FIG. 3, the metal sections 18 and/or 19 are spaced a distance between with their smooth rear walls, forming an intermediate space 20 which serves to accommodate a vertical web of a bracket 3 of the roof part 2 and thus as a flange 23. The bracket 3 is attached to the metal sections 18 and/or 19 by means of a fastening 24, e.g., by screws.

In the lower area the metal sections 18 and/or 19 have several passages 11 that coincide with one another and are arranged one after the other in a longitudinal direction. The passages 11 are designed as boreholes or as elongated holes produced by punching, for example. The passages 11 together with the lower parts of the metal sections 18 and/or 19 arranged beneath them are completely sheathed with a plastic material 14, which also at the same time forms the two laterally protruding guide webs 10 with the slide tracks 15 and/or 16. Due to the fact that the plastic material passes through the passages 11, this forms a highly load-bearing connection between the metal sections 18 and/or 19 and the plastic material 14, so that on the whole a highly load-bearing gate 9 is formed from the combination of metal and plastic.

Figure 4:
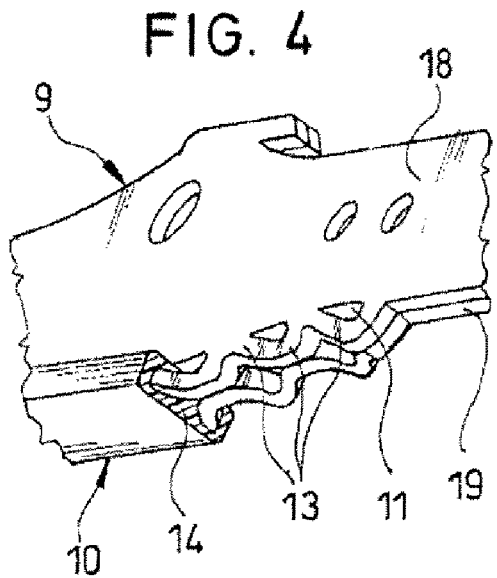
FIG. 4 shows a schematic perspective side view of a second inventive embodiment of a cover gate.

In the second exemplary embodiment according to FIG. 4, again two metal sections 18 and/or 19 which are in smooth surface contact with one another along their back sides are also joined together to form a gate 9. For a more intimate connection to the plastic material 14 that forms the guide webs 10, the metal sections 18 and/or 19, as is already known from the first exemplary embodiment according to FIG. 3, are provided with multiple passages 11 arranged one after the other in the longitudinal direction close to their rear edge, but in addition the material of the metal sections 18 and 19 beneath the passages 11 is shaped by embossing 13 that protrudes outward at uniform intervals and is corrugated in the example shown here. The embossing 13 may be produced simultaneously with the passages 11 on the metal sections 18 and 19 in one operation using a suitable punching-bending tool. The embossing 13 serve to increase the surface area by which the plastic material 14 is bonded to the metal of the metal sections 18 and 19, so that the strength of such a gate is further increased.

Figure 5:
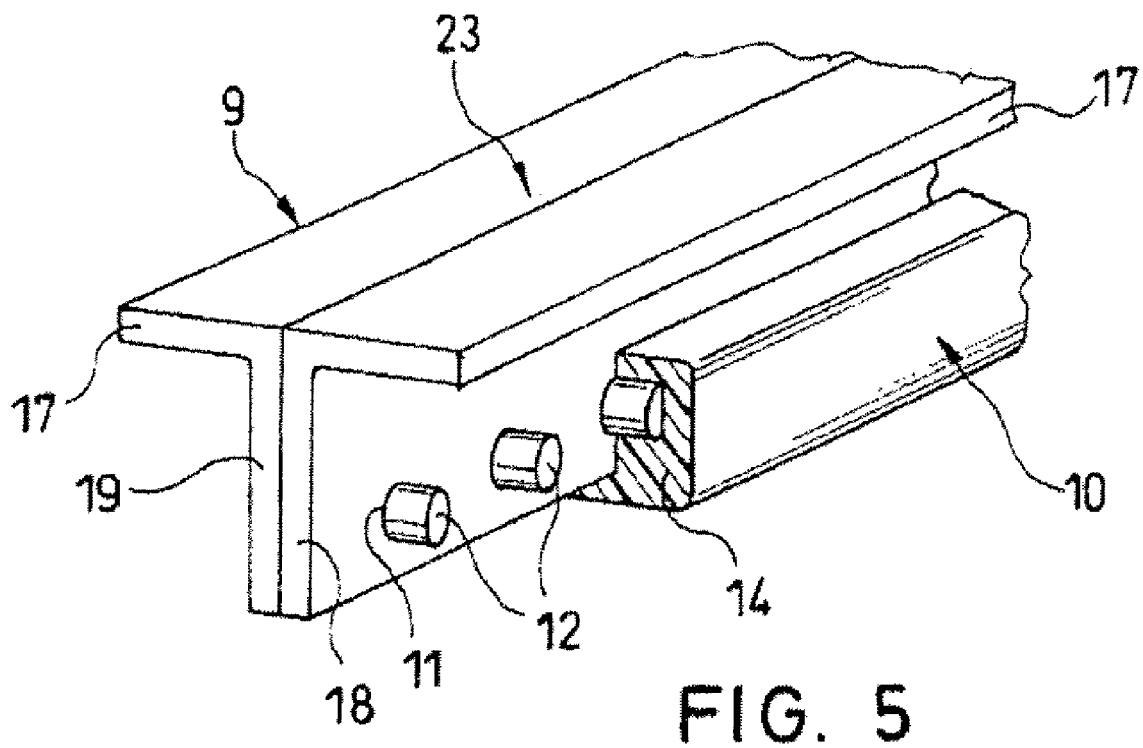
FIG. 5 shows a schematic perspective view of a third inventive embodiment of a cover gate and FIG. 6 shows a cross section through the third embodiment.
Figure 6:
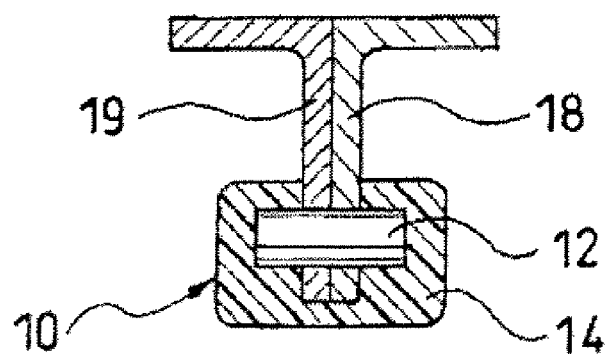

A third variant of an inventive gate is shown in FIGS. 5 and 6. The two metal sections 18 and 19 forming the gate 9 with their horizontal webs 17 formed at the upper ends are joined together along their smooth back sides. The passages 11 are designed as cylindrical bores. Load-bearing bolts 12 are anchored in the cylindrical bores of the passages 11; they may be made of metal, but are preferably made of a plastic material having a greater strength than the plastic material 14 forming the guide webs 10 with the slide tracks 15 and 16. The load-bearing bolts 12 preferably extend through the coinciding passages 11 in the two vertical legs of the metal sections 18 and 19, so that they protrude uniformly on both sides. The load-bearing bolts 12 may additionally be joined to the metal of the metal sections 18 and 19, e.g., by heating or adhesive bonding. Then plastic material 14 is injected or cast in a mold corresponding to the contour of the sliding webs 10 over the entire lower area of the metal sections 18 and 19 in which the load-bearing bolts 12 are situated, so that this plastic material 14 forms two horizontally opposed sliding webs 10. The plastic material 14 extends completely around the load-bearing bolts 12, the lower part of the side faces of the metal sections 18 and 19 and their underside. It forms the slide tracks 15 for the carriage 8 on the top side of the two sliding webs 10 and forms the slide tracks 16 on the entire bottom side. All three variants have in common the method for sheathing or casting plastic around the lower part of the gates 9, including the passages 11. In the third exemplary embodiment (although here it is indirect by at least partially surrounding the load-bearing bolts 12) the passages 11 thus also serve to anchor the plastic 14 of the guide webs 10.

In all three embodiments, an inexpensive gate 9 that is simple to manufacture and has a high strength and good sliding properties is created.

The invention claimed is:

1. A vehicle roof having a movable roof part which can be deployed into a ventilation position by means of a deployment and/or displacement mechanism and/or which can be displaced above or below the vehicle roof and/or an at least partially fixed roof section to at least partially release a roof opening in the vehicle roof, such that the deployment and/or displacement mechanism comprises at least one vertical gate having at least one guide web with slide tracks arranged perpendicular to the gate, these slide tracks surrounded at least partially by a sliding element of a carriage movable along a guide rail, such that the gate is made of metal and the guide web is made at least partially of plastic material,
   characterized in that the gate has several passages spaced a distance apart from one another for anchoring the plastic material of the guide webs, and
   characterized in that the gate has bulged embossing that protrudes into the guide webs in the area of the passages.

2. A vehicle roof of claim 1;
   characterized in that the gate is formed by two metal sections that are identical in mirror image.

3. A vehicle roof of claim 2;
   characterized in that the metal sections form a flange on their top side for fastening onto the roof part.

4. A vehicle roof of claim 3;
   characterized in that the flange is formed by a horizontal cross web on the upper edge of the metal sections.

5. A vehicle roof of claim 2;
   characterized in that the metal sections form a vertical intermediate space for a bracket of the roof part at least near their upper edge.

6. A vehicle roof of claim 1;
   characterized in that the guide webs are designed with the slide tracks as sheathings of plastic material.

7. A vehicle roof of claim 1;
   characterized in that the passages are designed as elongated holes.

8. A vehicle roof of claim 1;
   characterized in that the passages are formed as boreholes.

9. The vehicle roof of claim 1, wherein the bulged embossing is a corrugation.

* * * * *